Patented Oct. 7, 1930

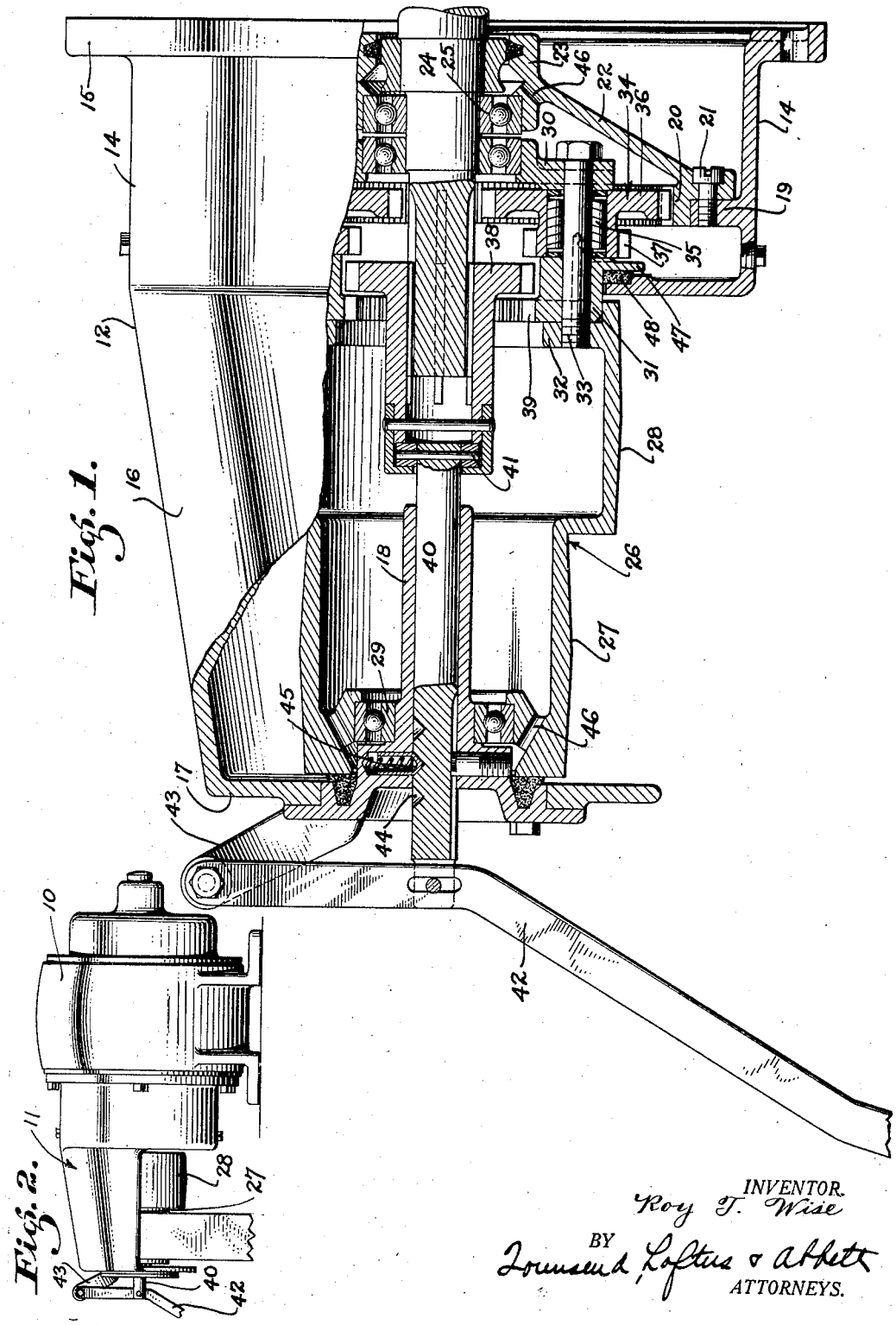

1,777,997

UNITED STATES PATENT OFFICE

ROY T. WISE, OF BERKELEY, CALIFORNIA, ASSIGNOR, BY MESNE ASSIGNMENTS, TO WISE PATENT AND DEVELOPMENT COMPANY, OF NEW YORK, N. Y., A CORPORATION OF DELAWARE

TWO-SPEED TRANSMISSION

Application filed June 6, 1928. Serial No. 283,247.

This invention relates to transmissions and particularly pertains to a variable speed transmission for electric motors.

It is the principal object of the present invention to provide a generally improved and simplified variable speed transmission for electric motors which may be directly connected to an electric motor, and which includes a selective drive mechanism capable of driving a belt or similar driving element at a plurality of speeds while the motor speed remains constant.

In carrying out the invention into practice, I provide a transmission capable of being directly mounted on the motor shaft in lieu of the usual end plate at the drive end of the motor. This transmission includes a cone pulley and a selective gear mechanism intermediate the pulley and the motor shaft so as to drive the pulley either at motor speed or at a speed relatively different from the motor speed. By this simple means a considerable number of belt speeds may be obtained.

One form which the invention may assume is exemplified in the following description and illustrated by way of example in the accompanying drawings, in which:

Fig. 1 is a central longitudinal section through a transmission embodying the preferred form of my invention.

Fig. 2 is a side elevation of the transmission showing it assembled on an electric motor of a standard type.

Referring more particularly to the accompanying drawings, 10 indicates an electric motor of standard design to which my improved transmission 11 may be connected. In assembling the transmission on the motor, one end plate of the latter is removed and the transmission 11 substituted therefor.

The transmission 11 includes a casing 12 having a substantially cylindrical portion 14 at its inner end. At this end of the casing it is formed with a radial flange 15, which may be securely bolted or otherwise secured to the frame of the motor 10 in lieu of the usual cover plate on the motor.

Projecting from the cylindrical portion 14 of the casing is a semi-cylindrical portion 16 having an end plate 17 at its outermost end. This end plate is formed with a removable trunnion 18 which projects inwardly through the end plate 17 to a point within the semi-cylindrical portion 16 of the casing.

Within the cylindrical portion 14 of the casing, I provide an annular inwardly projecting flange 19. An internal ring gear 20 is shouldered to receive this flange 19 and is connected to the flange by means of cap screws or other connecting elements 21. The internal ring gear 20 is provided with a web 22 having a bearing structure 23 at its center which embraces the motor shaft 24. The bearing structure 23 includes an anti-friction bearing 25 supporting the motor shaft 24.

Arranged concentrically of the motor shaft and within the semi-cylindrical portion 16 of the casing is a driving element which includes a hollow cone pulley 26 embodying two pulleys 27 and 28 of different diameters. At its outer end the cone pulley 26 is fitted with a bearing 29 on the trunnion 18. At its inner end the cone pulley 26 is fitted with a spider structure embodying an inner plate 30 and an outer plate 31, the latter of which abuts against an internal flange 32 in the end of the cone pulley 26. The inner plate or disk 30 is fitted with a bearing on the motor shaft 24 to support the inner end of the cone pulley 26.

The inner and outer plates 30 and 31 are rigidly connected to the inner end of the cone pulley 26 by means of studs or cap screws 33. Two of these studs or cap screws which are located upon diametrically opposite sides of the motor shaft 24, constitute spindles upon which planet units 34 are mounted. Anti-friction bearings 35 are arranged on the studs 33 which constitute the planet unit shafts so that the planet units will revolve easily and freely.

These planet units each comprise a gear 36 in mesh with the internal ring gear 20 and a pinion 37, which is adapted to mesh with a sliding gear 38 splined on the motor shaft 24. This sliding gear 38 is also adapted to mesh with an internal gear 39 formed on the outer disk 31 at the inner end of the cone pulley 26.

It is obvious that engagement of the sliding gear 38 with the internal gear 39 will directly connect the cone pulley to the motor shaft 24, so that the cone puley will be driven at the same speed as the motor shaft. However, when the sliding gear 38 is in mesh with the pinion 37 the cone pulley will be driven by means of the gear 36, driving around the stationary internal gear 20. In this latter operation, the pulley will be driven in the same direction as the motor shaft but at a relatively different rate of speed.

To operate the sliding gear 38, I provide a control shaft 40 which extends through the trunnion 18 in the outer end of the transmission casing. The inner end of this control shaft 40 is connected to the sliding gear 38 by a connection 41 which permits the gear 38 to revolve relative to the shaft 40.

To operate the shaft 40, I provide a fulcrum lever 42 pivoted at one end to a bracket 43 at the outer end of the transmission casing 14. Intermediate its ends the lever 42 is connected with the shaft 40 so that oscillation of the lever 42 will be translated into reciprocation of the control shaft 40. The control shaft 40 is provided with sockets 44 engageable by a spring-pressed member 45 carried by the trunnion 18. These sockets are properly spaced apart so that the member 45 will latch the control shaft in position, properly positioning the sliding gear 38 relative to the remainder of its cooperating elements.

I desire that the operating parts of the present transmission be run in lubricant and for this purpose I provide an oil seal at the inner end of the bearing structure 23 and at a point intermediate the outer end of the pulley 26 and the casing 14 surrounding the trunnion 18. Oil passing the bearings at opposite ends of the structure will be prevented from escaping by the seals provided and may pass backwardly either within the pulley 26 or within the cylindrical portion of the casing through passageways 46.

At the point where the pulley structure projects through the end in the cyylindrical portion of the casing 14, I provide the outer disk 31 with a surrounding flange 47 which is greater in diameter than the opening in the end of the cylindrical portion of the housing through which the pulley structure extends. A felt ring 48 is interposed between the flange 47 and the end wall of the cylindrical portion of the housing to prevent lubricant from escaping from the housing.

As the pulley 26 is hollow, an oil chamber will be formed therein and within the outer portion of the cylindrical portion of the casing 14. This chamber may be kept supplied with lubricant which will reach all of the operating parts of the structure needing lubrication.

In operation of the device, it is constructed and assembled as described and the casing 14 is bolted to the motor frame. If it is desired to drive the pulley at motor speed, the sliding gear 38 is placed in mesh with the internal gear 39 carried by the cone pulley 26. This will effectively clutch the cone pulley to the motor shaft 24 and drive the pulley at the same speed as the motor.

Two different belt speeds may be obtained, however, because the cone pulley is formed in two pulleys of different diameters and the belt may be shifted from one pulley to the other providing two different belt speeds when the pulley is directly connected to the motor shaft.

By shifting the sliding gear 38 inwardly into mesh with the pinions 37 in the planet units, the planet units will be driven and their gears 36 will drive around the internal gear 20 and revolve the cone pulley 26 in the same direction as the motor shaft but at a relatively different rate of speed.

When the gears are so positioned two different belt speeds may be obtained by shifting the belt from pulley 28 to pulley 27 or vice versa. Thus, in the present transmission by the use of a simple gear mechanism and pulley construction, I obtain four different belt speeds, making the device very desirable for use in driving machine tools or similar machines.

From the foregoing it is obvious that I have provided a simple and compact transmission for electric motors wherein all of the wearing parts are exposed to lubrication and wherein four different belt speeds may be obtained.

It is obvious that by the provision of a greater number of sliding gears and gears on the planet units that the number of belt speeds may be increased without departing from the spirit of the invention.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. A transmission comprising a casing, a power shaft projecting into the casing, a plurality of pulleys of different diameters relatively fixed together and arranged concentrically of the power shaft, a stationary internal gear, a planet gear carried by the pulleys in mesh with said internal gear, a gear relatively fixed to said planet gear, a gear splined on the power shaft and adapted to be placed in mesh with said gear fixed to the planet gear to drive said pulleys from the motor shaft.

2. A transmission comprising a casing, a power shaft projecting into the casing, a plurality of pulleys of different diameters relatively fixed together and arranged concentrically of the power shaft, an internal gear fixed to the casing, a planet gear carried by the pulleys in mesh with said internal gear, a gear relatively fixed to said planet gear, a gear splined on the power shaft and adapted to be placed in mesh with said gear fixed to the planet gear to drive said pulleys from the power shaft, an internal gear fixed to the pulleys and with which said gear on the power shaft is adapted to be placed in mesh to drive the pulleys at the same speed as the power shaft.

3. A transmission comprising a casing, a power shaft projecting into the casing, a plurality of pulleys of different diameters relatively fixed together and rotatable concentrically of the power shaft, a stationary internal gear fixed to the casing concentric of the motor shaft, a planet gear carried by said pulleys in mesh with said internal gear, a gear relatively fixed to the planet gear, an internal gear relatively fixed to the pulleys and disposed concentric of the power shaft, a sliding gear splined on the motor shaft and capable of operation to be placed in mesh with either the internal gear carried by the pulleys or the gear fixed to the planet gear.

4. A transmission comprising a casing, a power shaft projecting into the casing, a plurality of pulleys of different diameters relatively fixed together and rotatably supported at one end on the power shaft and at the other end on the casing, a stationary internal gear fixed to the casing concentric of the motor shaft, a planet gear carried by said pulleys in mesh with said internal gear, a gear relatively fixed to the planet gear, an internal gear relatively fixed to the pulleys and disposed concentric of the power shaft, a sliding gear splined on the power shaft and capable of operation to be placed in mesh with either the internal gear carried by the pulleys or the gear fixed to the planet gear, and means disposed exteriorly of the casing and operatively connected with said sliding gear to operate the same.

5. A transmission comprising a casing, a bearing at one end of said casing, a power shaft journalled in said bearing and projecting into the casing, a plurality of relatively fixed pulleys of different diameters arranged within said casing in axial alignment with the power shaft, said pulleys having a bearing at one end on the power shaft, a trunnion formed on the casing opposite said bearing and upon which the other end of said pulleys bear, a control shaft reciprocable through said trunnion, a stationary internal gear fixed to the casing, a planet gear carried by said pulleys in mesh with said internal gear, a gear fixed to the planet gear, an internal gear fixed to the pulleys concentrically of the power shaft, a sliding gear splined on the power shaft, an operative connection between said control shaft and said sliding gear whereby said sliding gear may be placed in mesh with the gear fixed to the planet gear or the internal gear carried by the pulleys by reciprocation of the control shaft.

6. A transmission comprising a casing, a bearing at one end of said casing, a power shaft projecting into the casing through said bearing, a plurality of relatively fixed pulleys of different diameters arranged within said casing in axial alignment with the power shaft, said pulleys having a bearing at one end on the power shaft, a trunnion formed on the casing opposite said bearing and upon which the other end of said pulleys bear, a control shaft reciprocable through said trunnion, a stationary internal gear fixed to the casing, a planet gear carried by said pulleys in mesh with said internal gear, a gear fixed to the planet gear, an internal gear fixed to the pulleys concentrically of the power shaft, a sliding gear splined on the power shaft, an operative connection between said control shaft and said sliding gear whereby said sliding gear may be placed in mesh with the gear fixed to the planet gear or the internal gear carried by the pulleys by reciprocation of the control shaft, means for reciprocating said control shaft, and means for yieldably retaining the control shaft in a set position.

ROY T. WISE.